US012686156B2

(12) United States Patent
Tsutsumi et al.

(10) Patent No.: US 12,686,156 B2
(45) Date of Patent: Jul. 21, 2026

(54) CONTROL DEVICE OF INJECTION MOLDING MACHINE, INJECTION MOLDING MACHINE, AND METHOD OF CONTROLLING INJECTION MOLDING MACHINE

(71) Applicant: SUMITOMO HEAVY INDUSTRIES, LTD., Tokyo (JP)

(72) Inventors: Yutaka Tsutsumi, Chiba (JP); Daigo Hotta, Chiba (JP); Shun Shibuya, Chiba (JP); Yuki Matsui, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 574 days.

(21) Appl. No.: 17/993,403

(22) Filed: Nov. 23, 2022

(65) Prior Publication Data

US 2023/0311391 A1      Oct. 5, 2023

(30) Foreign Application Priority Data

Mar. 30, 2022    (JP) ................................. 2022-056546

(51) Int. Cl.
*B29C 45/78*          (2006.01)
*B29C 45/74*          (2006.01)
(52) U.S. Cl.
CPC .............. *B29C 45/78* (2013.01); *B29C 45/74* (2013.01); *B29C 2945/76043* (2013.01);
(Continued)
(58) Field of Classification Search
CPC ................... B29C 45/78; B29C 45/74; B29C 2945/76043; B29C 2945/7619;
(Continued)

(56) References Cited

U.S. PATENT DOCUMENTS 4,721,589 A * 1/1988 Harris ..................... B29C 48/05
                                                            264/40.6
2004/0166188 A1* 8/2004 Uchiyama ............... B29C 45/74
                                                            425/550
(Continued)

FOREIGN PATENT DOCUMENTS

CN          1846969 A  * 10/2006  ............. B29C 45/78
CN      104070653 A     10/2014
(Continued)

OTHER PUBLICATIONS

Google AI, "energization time per unit time", 4 pp. 6, 2025, downloaded from https://www.google.com/search?q=energization+ time+per+unit+time&safe=active&sca_esv=b42e03ff43b61ad3 &sxsrf=AE3TifObNKu9JEOhQDNN8jZGpDnykD4Oyw% 3A1748991303582&ei=R30 (Year: 2025).*
(Continued)

*Primary Examiner* — Robert E Fennema
*Assistant Examiner* — Olvin Lopez Alvarez
(74) *Attorney, Agent, or Firm* — WTA IP Law P.C.

(57)          ABSTRACT

A technique for managing a shear heating value of a molding material is provided. A control device of an injection molding machine individually controls outputs of a plurality of heating units for a plurality of zones, respectively, into which a cylinder is divided in a flow direction of a molding material. The control device acquires the output of the heating unit provided in a predetermined zone both in a steady state in which an operation of a screw provided inside the cylinder is stopped and at a time of molding at which the operation of the screw is performed, and calculates a difference in output of the heating unit provided in the predetermined zone between at a time of molding and in the steady state.

7 Claims, 6 Drawing Sheets

(52) U.S. Cl.
     CPC ................. *B29C 2945/7619* (2013.01); *B29C*
            *2945/76381* (2013.01); *B29C 2945/76414*
          (2013.01); *B29C 2945/76531* (2013.01); *B29C*
                            *2945/76658* (2013.01)

(58) Field of Classification Search
     CPC ........... B29C 2945/76381; B29C 2945/76414;
              B29C 2945/76531; B29C 2945/76658;
                            B29C 2945/7604
     See application file for complete search history.

(56)                    References Cited

U.S. PATENT DOCUMENTS

| | | | | |
|---|---|---|---|---|
| 2011/0236772 A1* | 9/2011 | Burchardt | ........... | H01M 4/8605 |
| | | | | 429/403 |
| 2022/0250300 A1* | 8/2022 | Gram | ................. | B29C 48/0017 |
| 2024/0335997 A1* | 10/2024 | Nesaki | ................... | B29C 45/18 |

FOREIGN PATENT DOCUMENTS

| | | | | |
|---|---|---|---|---|
| CN | 106985332 A | 7/2017 | | |
| DE | 10 2018 122 693 A1 | 3/2019 | | |
| DE | 102023101131 A1 * | 10/2023 | ............. | B29C 45/78 |
| EP | 2 700 488 A1 | 2/2014 | | |
| EP | 2674277 B1 * | 10/2014 | ......... | B29C 45/7666 |
| JP | S62275730 A * | 11/1987 | ............. | B29C 45/62 |
| JP | 2013-52510 | 3/2013 | | |
| JP | 2018022562 A * | 2/2018 | ............... | H05B 3/00 |

OTHER PUBLICATIONS

Office Action of the corresponding DE 102023101131.6 mailed on Apr. 11, 2025.
Office Action of CN Application No. 202211649336.1 Mailed on Aug. 27, 2025.
Office Action of the corresponding CN Application No. 202211649336.1 Mailed on Mar. 23, 2026.

* cited by examiner

FIG. 4

| | Z1 | | | Z2 | | | Z3 | | | Z4 | | |
|---|---|---|---|---|---|---|---|---|---|---|---|---|
| | $T_1$ [°C] | $\Delta W_1$ [%] | $W_1$ [%] | $T_2$ [°C] | $\Delta W_2$ [%] | $W_2$ [%] | $T_3$ [°C] | $\Delta W_3$ [%] | $W_3$ [%] | $T_4$ [°C] | $\Delta W_4$ [%] | $W_4$ [%] |
| STEADY STATE | 280 | - | 30 | 290 | - | 25 | 300 | - | 15 | 310 | - | 20 |
| MOLDING | 280 | +20 | 50 | 290 | +15 | 40 | 300 | +15 | 30 | 310 | +10 | 30 |
| FIRST ADJUSTMENT | 280 | +20 | 50 | 290 | +15 | 40 | 305 | +20 | 35 | 310 | +5 | 25 |
| SECOND ADJUSTMENT | 280 | +20 | 50 | 300 | +25 | 50 | 305 | +18 | 33 | 310 | +5 | 25 |

FIG. 6

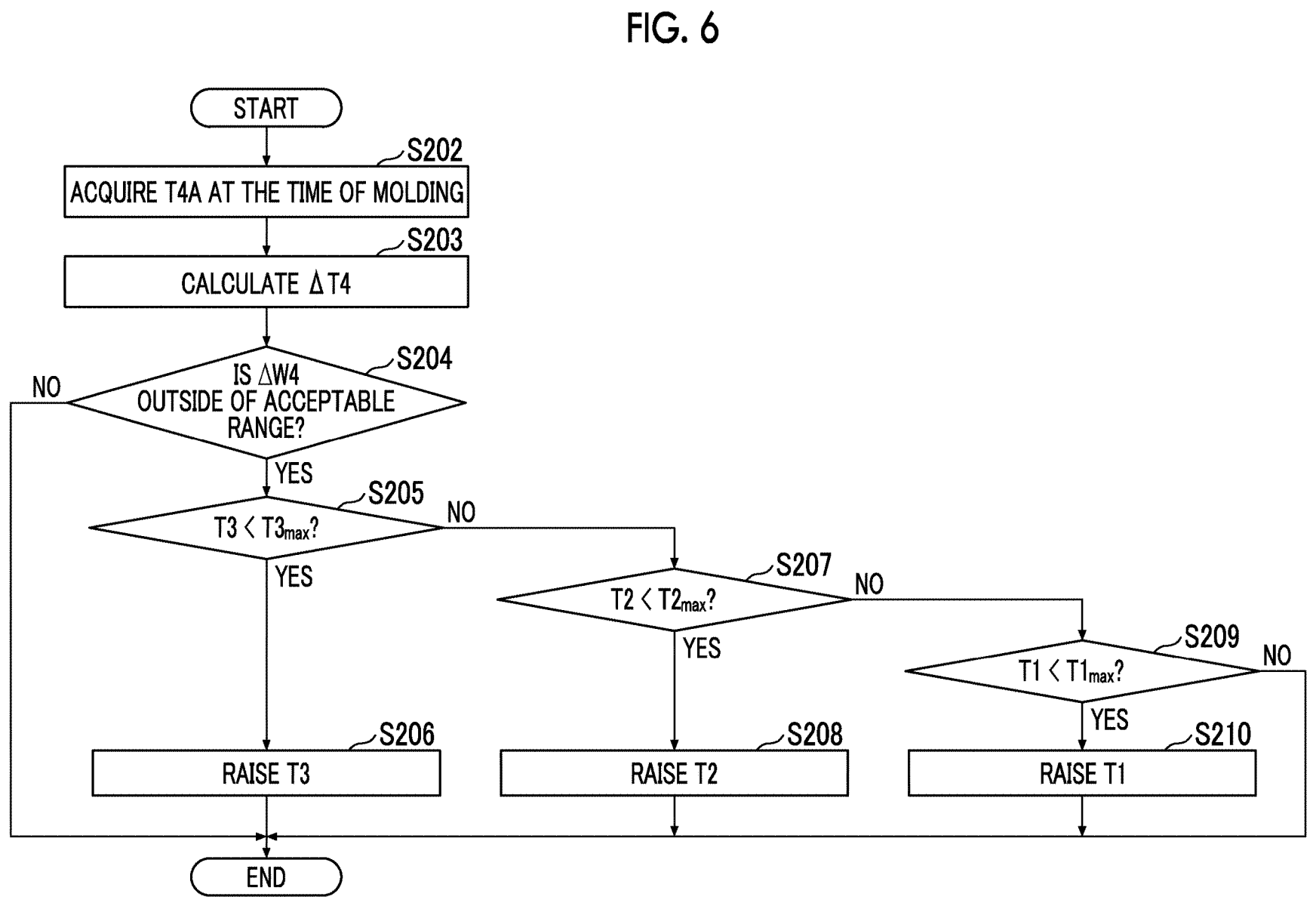

START

S202
ACQUIRE T4A AT THE TIME OF MOLDING

S203
CALCULATE ΔT4

S204
IS ΔW4 OUTSIDE OF ACCEPTABLE RANGE?

NO → END

YES

S205
T3 < T3$_{max}$?

YES

S206
RAISE T3 → END

NO

S207
T2 < T2$_{max}$?

YES

S208
RAISE T2

NO

S209
T1 < T1$_{max}$?

YES

S210
RAISE T1

NO

END

CONTROL DEVICE OF INJECTION MOLDING MACHINE, INJECTION MOLDING MACHINE, AND METHOD OF CONTROLLING INJECTION MOLDING MACHINE

CROSS-REFERENCE TO RELATED APPLICATIONS

This application claims priority to Japanese Patent Application No. 2022-056546, filed on Mar. 30, 2022, which is incorporated by reference herein in its entirety.

BACKGROUND

Technical Field

Certain embodiments of the present invention relate to a control device of an injection molding machine, an injection molding machine, and a method of controlling an injection molding machine.

Description of Related Art

In an injection molding machine in the related art, a plasticizing cylinder is divided into a plurality of zones for temperature control. The plasticizing cylinder has an intermediate zone disposed between a first zone and a second zone. A temperature sensor is provided in the intermediate zone for the temperature control, but a heater is not provided. A temperature of the intermediate zone is adjusted by an output of a heater provided in the first zone or the second zone.

SUMMARY

An injection molding machine includes a cylinder that heats a molding material. The cylinder is divided into a plurality of zones in an axial direction of the cylinder. A heating unit and a temperature measurer are provided in each of the plurality of zones. A control device controls an output of the heating unit so that a set temperature is set in each of the plurality of zones and a temperature measured by the temperature measurer reaches the set temperature.

The injection molding machine includes a screw inside the cylinder. When the screw is rotated, a molding material is fed forward along a helical groove of the screw. The molding material is gradually melted by heat from the heating unit while being fed forward. A temperature of the molding material is mainly controlled by the output of the heating unit.

BRIEF DESCRIPTION OF THE DRAWINGS

FIG. 4 is a view showing an example of set temperatures of a cylinder and outputs of first heating units.

FIG. 6 is a flowchart showing another example of the processing performed by the control device.

DETAILED DESCRIPTION

Figure 1:
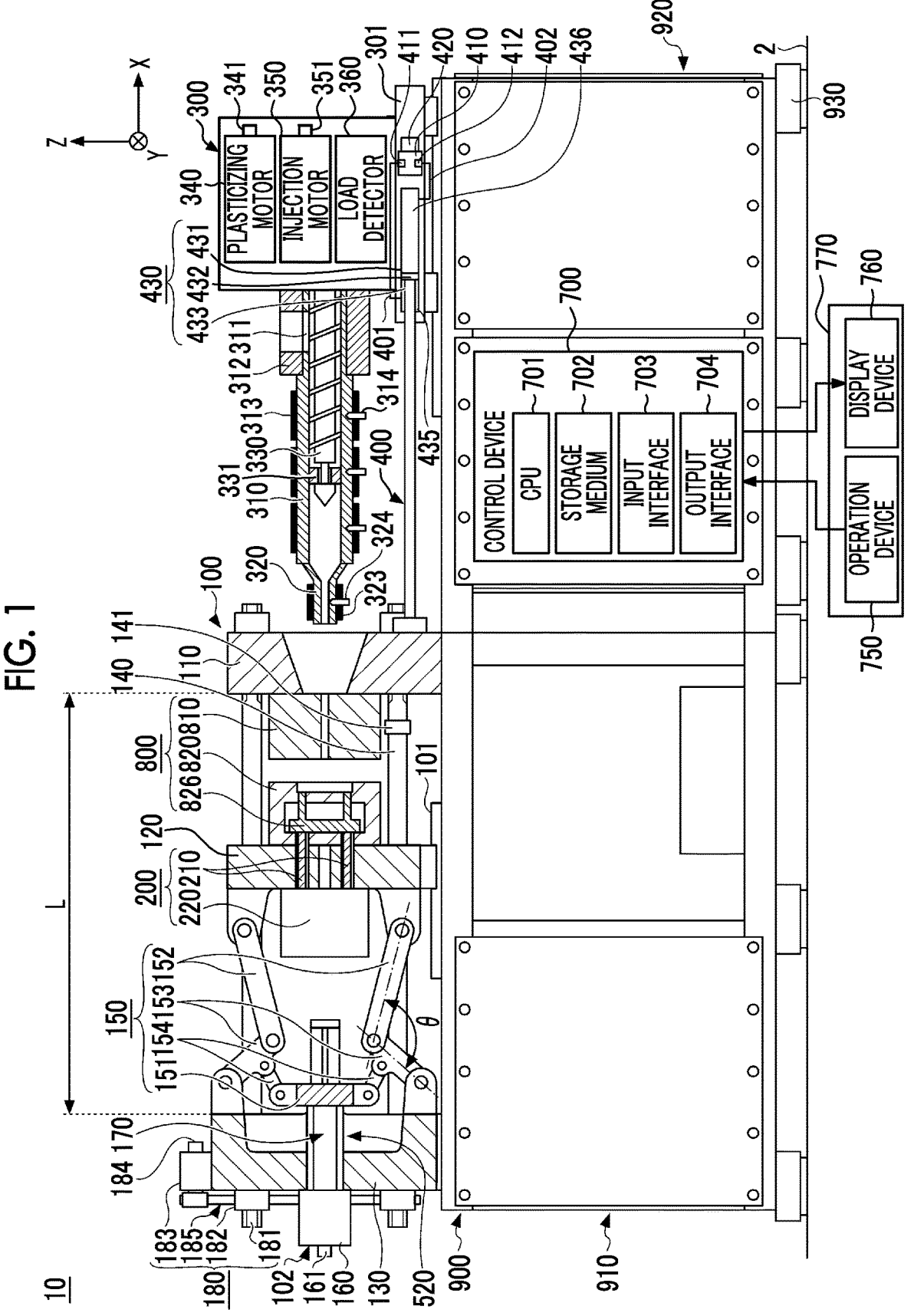
FIG. 1 is a view showing a state when mold opening is completed in an injection molding machine according to an embodiment.

The temperature of the molding material in the cylinder is mainly controlled by the output of the heating unit, but may fluctuate due to shear heating due to the rotation of the screw. Since shear heating raises the temperature of the molding material, the larger a shear heating value is, the higher the temperature of the molding material is. Unlike the output of the heating unit, the shear heating value is difficult to control.

Therefore, in order to control the temperature of the molding material to a desired temperature, it is preferable to reduce the shear heating value as much as possible. The reason why the temperature of the molding material is controlled to a desired temperature is that, for example, when the temperature of the molding material is too high, molding defects occur.

Examples of the molding defects caused by the temperature of the molding material being too high include gas burning, black spots, and black stripes. Gas burning is a phenomenon in which, as a molding material flows into a cavity space inside a mold unit, a gas in the cavity space is compressed and generates heat, and the molding material is carbonized. When the temperature of the molding material is too high, a large amount of gas is generated due to thermal decomposition of the molding material, and gas burning occurs. Black spots are a phenomenon in which black spots appear in a molding product. Black stripes are a phenomenon in which black streaks appear in a molding product. When the temperature of the molding material is too high, thermal deterioration of the molding material occurs, and black spots or black stripes appear.

When the frequency of molding defects is high, the frequency of maintenance of the mold unit is also high.

According to an embodiment of the present invention, there is provided a technique for managing a shear heating value of a molding material.

A control device of an injection molding machine according to an aspect of the present invention individually controls outputs of a plurality of heating units for each of a plurality of zones into which a cylinder is divided in a flow direction of a molding material. The control device acquires the output of the heating unit provided in a predetermined zone both in a steady state in which an operation of a screw provided inside the cylinder is stopped and at a time of molding at which the operation of the screw is performed, and calculates a difference in output of the heating unit provided in the predetermined zone between at the time of molding and in the steady state.

According to the aspect of the present invention, the difference in output between at the time of molding and in the steady state is calculated. While the screw rotates and shear heating occurs at the time of molding, the screw does not rotate and shear heating does not occur in the steady state. Therefore, the difference in output between at the time of molding and in the steady state represents a shear heating value. Therefore, the shear heating value of the molding material can be managed by calculating the difference in output.

Hereinafter, embodiments of the present invention will be described with reference to the drawings. In each drawing, the same or corresponding reference numerals will be assigned to the same or corresponding configurations, and description thereof will be omitted.

Injection Molding Machine

Figure 2:
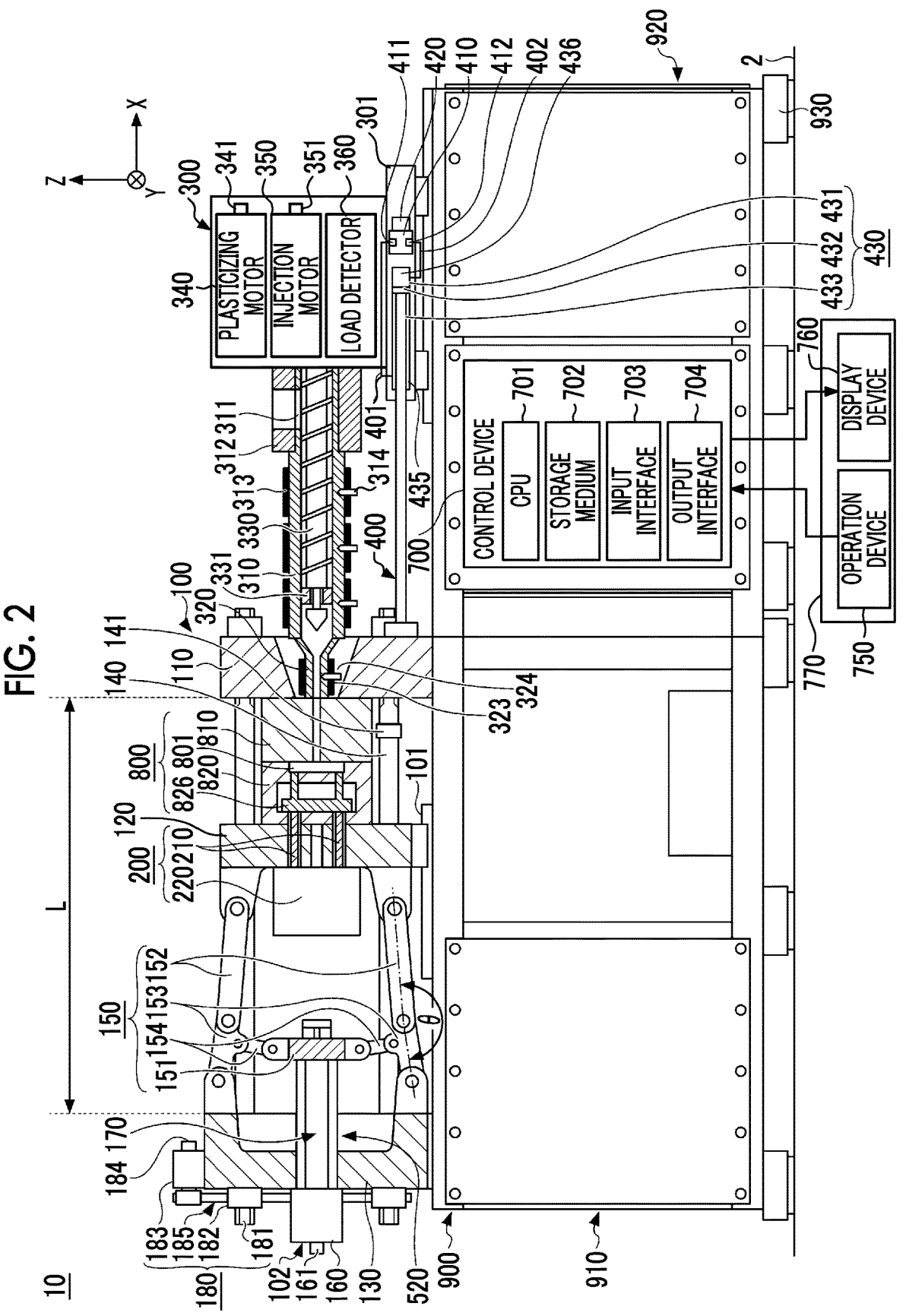
FIG. 2 is a view showing a state when mold clamping is performed in the injection molding machine according to the embodiment.

FIG. 1 is a view showing a state when mold opening is completed in an injection molding machine according to an embodiment. FIG. 2 is a view showing a state when mold clamping is performed in the injection molding machine according to the embodiment. In the present specification, an X-axis direction, a Y-axis direction, and a Z-axis direction are perpendicular to each other. The X-axis direction and the Y-axis direction represent a horizontal direction, and the Z-axis direction represents a vertical direction. In a case where a mold clamping unit 100 is of a horizontal type, the X-axis direction represents a mold opening and closing direction, and the Y-axis direction represents a width direction of an injection molding machine 10. A negative side in the Y-axis direction will be referred to as an operation side, and a positive side in the Y-axis direction will be referred to as a counter operation side.

As shown in FIGS. 1 and 2, the injection molding machine 10 includes the mold clamping unit 100 that opens and closes a mold unit 800, an ejector unit 200 that ejects a molding product molded by the mold unit 800, an injection unit 300 that injects a molding material into the mold unit 800, a moving unit 400 that causes the injection unit 300 to advance and retreat with respect to the mold unit 800, a control device 700 that controls each component of the injection molding machine 10, and a frame 900 that supports each component of the injection molding machine 10. The frame 900 includes a mold clamping unit frame 910 that supports the mold clamping unit 100, and an injection unit frame 920 that supports the injection unit 300. The mold clamping unit frame 910 and the injection unit frame 920 are respectively installed on a floor 2 via a leveling adjuster 930. The control device 700 is disposed in an internal space of the injection unit frame 920. Hereinafter, each component of the injection molding machine 10 will be described.

Mold Clamping Unit

In describing the mold clamping unit 100, a moving direction of a movable platen 120 during mold closing (for example, a positive direction of an X-axis) will be defined as forward, and a moving direction of the movable platen 120 during mold opening (for example, a negative direction of the X-axis) will be defined as rearward.

The mold clamping unit 100 performs mold closing, pressurizing, mold clamping, depressurizing, and mold opening of the mold unit 800. The mold unit 800 includes a stationary mold 810 and a movable mold 820.

For example, the mold clamping unit 100 is of a horizontal type, and the mold opening and closing direction is a horizontal direction. The mold clamping unit 100 includes a stationary platen 110 to which the stationary mold 810 is attached, the movable platen 120 to which the movable mold 820 is attached, and a moving mechanism 102 that moves the movable platen 120 in the mold opening and closing direction with respect to the stationary platen 110.

The stationary platen 110 is fixed to the mold clamping unit frame 910. The stationary mold 810 is attached to a surface of the stationary platen 110 facing the movable platen 120.

The movable platen 120 is disposed to be movable in the mold opening and closing direction with respect to the mold clamping unit frame 910. A guide 101 that guides the movable platen 120 is laid on the mold clamping unit frame 910. The movable mold 820 is attached to a surface of the movable platen 120 facing the stationary platen 110.

The moving mechanism 102 causes the movable platen 120 to advance and retreat with respect to the stationary platen 110 such that mold closing, pressurizing, mold clamping, depressurizing, and mold opening of the mold unit 800 are performed. The moving mechanism 102 includes a toggle support 130 disposed at an interval from the stationary platen 110, a tie bar 140 that connects the stationary platen 110 and the toggle support 130 to each other, a toggle mechanism 150 that moves the movable platen 120 in the mold opening and closing direction with respect to the toggle support 130, a mold clamping motor 160 that operates the toggle mechanism 150, a motion conversion mechanism 170 that converts a rotary motion into a linear motion of the mold clamping motor 160, and a mold space adjustment mechanism 180 that adjusts an interval between the stationary platen 110 and the toggle support 130.

The toggle support 130 is disposed at an interval from the stationary platen 110, and is placed on the mold clamping unit frame 910 to be movable in the mold opening and closing direction. The toggle support 130 may be disposed to be movable along a guide laid on the mold clamping unit frame 910. The guide of the toggle support 130 may be common to the guide 101 of the movable platen 120.

In the present embodiment, the stationary platen 110 is fixed to the mold clamping unit frame 910, and the toggle support 130 is disposed to be movable in the mold opening and closing direction with respect to the mold clamping unit frame 910. However, the toggle support 130 may be fixed to the mold clamping unit frame 910, and the stationary platen 110 may be disposed to be movable in the mold opening and closing direction with respect to the mold clamping unit frame 910.

The tie bar 140 connects the stationary platen 110 and the toggle support 130 to each other at an interval L in the mold opening and closing direction. A plurality of (for example, four) tie bars 140 may be used. The plurality of tie bars 140 are disposed parallel to each other in the mold opening and closing direction, and extend in accordance with a mold clamping force. At least one of the tie bars 140 may be provided with a tie bar strain detector 141 that measures a strain of the tie bar 140. The tie bar strain detector 141 transmits a signal indicating a measurement result thereof to the control device 700. The measurement result of the tie bar strain detector 141 is used in measuring the mold clamping force.

In the present embodiment, as a mold clamping force detector for measuring the mold clamping force, the tie bar strain detector 141 is used. However, the present invention is not limited thereto. The mold clamping force detector is not limited to a strain gauge type. The mold clamping force detector may be of a piezoelectric type, a capacitive type, a hydraulic type, or an electromagnetic type, and an attachment position thereof is not limited to the tie bar 140.

The toggle mechanism 150 is disposed between the movable platen 120 and the toggle support 130, and moves the movable platen 120 in the mold opening and closing direction with respect to the toggle support 130. The toggle mechanism 150 has a crosshead 151 that moves in the mold opening and closing direction, and a pair of link groups bent and stretched by a movement of the crosshead 151. Each of the pair of link groups has a first link 152 and a second link 153 which are connected to be freely bent and stretched by a pin. The first link 152 is oscillatingly attached to the movable platen 120 by a pin. The second link 153 is oscillatingly attached to the toggle support 130 by a pin. The second link 153 is attached to the crosshead 151 via a third link 154. When the crosshead 151 is caused to advance and retreat with respect to the toggle support 130, the first link 152 and the second link 153 are bent and stretched, and the movable platen 120 advances and retreats with respect to the toggle support 130.

A configuration of the toggle mechanism 150 is not limited to configurations shown in FIGS. 1 and 2. For example, in FIGS. 1 and 2, the number of nodes in each link group is five, but may be four. One end portion of the third link 154 may be connected to the node between the first link 152 and the second link 153.

The mold clamping motor 160 is attached to the toggle support 130, and operates the toggle mechanism 150. The mold clamping motor 160 causes the crosshead 151 to advance and retreat with respect to the toggle support 130 such that the first link 152 and the second link 153 are bent and stretched and the movable platen 120 advances and retreats with respect to the toggle support 130. The mold clamping motor 160 is directly connected to the motion conversion mechanism 170, but may be connected to the motion conversion mechanism 170 via a belt or a pulley.

The motion conversion mechanism 170 converts a rotary motion of the mold clamping motor 160 into a linear motion of the crosshead 151. The motion conversion mechanism 170 includes a screw shaft and a screw nut screwed to the screw shaft. A ball or a roller may be interposed between the screw shaft and the screw nut.

The mold clamping unit 100 performs a mold closing process, a pressurizing process, a mold clamping process, a depressurizing process, and a mold opening process under the control of the control device 700.

In the mold closing process, the mold clamping motor 160 is driven to cause the crosshead 151 to advance to a mold closing completion position at a set movement speed, thereby causing the movable platen 120 to advance such that the movable mold 820 touches the stationary mold 810. For example, a position or a movement speed of the crosshead 151 is measured by using a mold clamping motor encoder 161. The mold clamping motor encoder 161 measures rotation of the mold clamping motor 160, and transmits a signal indicating a measurement result thereof to the control device 700.

A crosshead position detector for measuring a position of the crosshead 151 and a crosshead movement speed detector for measuring a movement speed of the crosshead 151 are not limited to the mold clamping motor encoder 161, and a general detector can be used. In addition, a movable platen position detector for measuring a position of the movable platen 120 and a movable platen movement speed detector for measuring a movement speed of the movable platen 120 are not limited to the mold clamping motor encoder 161, and a general detector can be used.

In the pressurizing process, the mold clamping motor 160 is further driven to cause the crosshead 151 to further advance from the mold closing completion position to a mold clamping position, thereby generating a mold clamping force.

In the mold clamping process, the mold clamping motor 160 is driven to maintain the position of the crosshead 151 at the mold clamping position. In the mold clamping process, the mold clamping force generated in the pressurizing process is maintained. In the mold clamping process, a cavity space 801 (refer to FIG. 2) is formed between the movable mold 820 and the stationary mold 810, and the injection unit 300 fills the cavity space 801 with a liquid molding material. A molding product is obtained by solidifying the molding material filled therein.

The number of the cavity spaces 801 may be one or more. In the latter case, a plurality of the molding products can be obtained at the same time. An insert material may be disposed in a portion of the cavity space 801, and the other portion of the cavity space 801 may be filled with the molding material. A molding product in which the insert material and the molding material are integrated with each other can be obtained.

In the depressurizing process, the mold clamping motor 160 is driven to cause the crosshead 151 to retreat from the mold clamping position to a mold opening start position such that the movable platen 120 retreats to reduce the mold clamping force. The mold opening start position and the mold closing completion position may be the same position.

In the mold opening process, the mold clamping motor 160 is driven to cause the crosshead 151 to retreat from the mold opening start position to a mold opening completion position at a set movement speed such that the movable platen 120 retreats and the movable mold 820 is separated from the stationary mold 810. Thereafter, the ejector unit 200 ejects the molding product from the movable mold 820.

Setting conditions in the mold closing process, the pressurizing process, and the mold clamping process are collectively set as a series of setting conditions. For example, the movement speed or positions (including a mold closing start position, a movement speed switching position, the mold closing completion position, and the mold clamping position) of the crosshead 151 and the mold clamping force in the mold closing process and in the pressurizing process are collectively set as a series of setting conditions. The mold closing start position, the movement speed switching position, the mold closing completion position, and the mold clamping position are aligned in this order from a rear side toward a front side, and represent a start point and an end point of a section in which the movement speed is set. The movement speed is set for each section. The number of the movement speed switching positions may be one or more. The movement speed switching position may not be set. Only one of the mold clamping position and the mold clamping force may be set.

The setting conditions in the depressurizing process and in the mold opening process are set in the same manner. For example, the movement speed or positions (the mold opening start position, the movement speed switching position, and the mold opening completion position) of the crosshead 151 in the depressurizing process and in the mold opening process are collectively set as a series of setting conditions. The mold opening start position, the movement speed switching position, and the mold opening completion position are aligned in this order from the front side toward the rear side, and represent the start point and the end point of the section in which the movement speed is set. The movement speed is set for each section. The number of the movement speed switching positions may be one or more. The movement speed switching position may not be set. The mold opening start position and the mold closing completion position may be the same position. In addition, the mold opening completion position and the mold closing start position may be the same position.

Instead of the movement speed, positions, and the like of the crosshead 151, the movement speed, positions, and the like of the movable platen 120 may be set. In addition, instead of the position (for example, the mold clamping position) of the crosshead 151 or the position of the movable platen 120, the mold clamping force may be set.

The toggle mechanism 150 amplifies a driving force of the mold clamping motor 160, and transmits the driving force to the movable platen 120. An amplification magnification is referred to as a toggle magnification. The toggle magnification is changed according to an angle θ (herein-after, also referred to as a "link angle θ") formed between the first link 152 and the second link 153. The link angle θ is obtained from the position of the crosshead 151. When the link angle θ is 180°, the toggle magnification is maximized.

In a case where a mold space of the mold unit 800 is changed due to replacement of the mold unit 800 or a temperature change in the mold unit 800, mold space adjustment is performed so that a predetermined mold clamping force is obtained during the mold clamping. For example, in the mold space adjustment, the interval L between the stationary platen 110 and the toggle support 130 is adjusted so that the link angle θ of the toggle mechanism 150 becomes a predetermined angle at a mold touch time at which the movable mold 820 touches the stationary mold 810.

The mold clamping unit 100 has the mold space adjust-ment mechanism 180. The mold space adjustment mecha-nism 180 performs the mold space adjustment by adjusting the interval L between the stationary platen 110 and the toggle support 130. For example, a time for the mold space adjustment is determined from an end point of a molding cycle to a start point of a subsequent molding cycle. For example, the mold space adjustment mechanism 180 has a screw shaft 181 formed in a rear end portion of the tie bar 140, a screw nut 182 held by the toggle support 130 to be rotatable and not to advance and retreat, and a mold space adjustment motor 183 that rotates the screw nut 182 screwed to the screw shaft 181.

The screw shaft 181 and the screw nut 182 are provided for each of the tie bars 140. A rotational driving force of the mold space adjustment motor 183 may be transmitted to a plurality of the screw nuts 182 via a rotational driving force transmitting unit 185. The plurality of screw nuts 182 can be rotated in synchronization with each other. The plurality of screw nuts 182 can be individually rotated by changing a transmission channel of the rotational driving force trans-mitting unit 185.

For example, the rotational driving force transmitting unit 185 is configured to include a gear. In this case, a driven gear is formed on an outer periphery of each screw nut 182, a driving gear is attached to an output shaft of the mold space adjustment motor 183, and a plurality of intermediate gears meshing with the driven gear and the driving gear are held to be rotatable in a central portion of the toggle support 130. The rotational driving force transmitting unit 185 may be configured to include a belt or a pulley instead of the gear.

An operation of the mold space adjustment mechanism 180 is controlled by the control device 700. The control device 700 drives the mold space adjustment motor 183 to rotate the screw nut 182. As a result, a position of the toggle support 130 with respect to the tie bar 140 is adjusted, and the interval L between the stationary platen 110 and the toggle support 130 is adjusted. In addition, a plurality of the mold space adjustment mechanisms may be used in com-bination.

The interval L is measured by using a mold space adjust-ment motor encoder 184. The mold space adjustment motor encoder 184 measures a rotation amount or a rotation direction of the mold space adjustment motor 183, and transmits a signal indicating a measurement result thereof to the control device 700. The measurement result of the mold space adjustment motor encoder 184 is used in monitoring or controlling the position or the interval L of the toggle support 130. A toggle support position detector for measur-ing the position of the toggle support 130 and an interval detector for measuring the interval L are not limited to the mold space adjustment motor encoder 184, and a general detector can be used.

The mold clamping unit 100 may include a mold tem-perature controller that adjusts the temperature of the mold unit 800. The mold unit 800 internally has a flow path of a temperature control medium. The mold temperature control-ler adjusts the temperature of the mold unit 800 by adjusting a temperature of the temperature control medium supplied to the flow path of the mold unit 800.

The mold clamping unit 100 of the present embodiment is of the horizontal type in which the mold opening and closing direction is the horizontal direction, but may be of a vertical type in which the mold opening and closing direction is an upward-downward direction.

The mold clamping unit 100 of the present embodiment has the mold clamping motor 160 as a drive unit. However, a hydraulic cylinder may be provided instead of the mold clamping motor 160. In addition, the mold clamping unit 100 may have a linear motor for mold opening and closing, and may have an electromagnet for mold clamping.

Ejector Unit

In describing the ejector unit 200, similarly to the descrip-tion of the mold clamping unit 100, a moving direction of the movable platen 120 during the mold closing (for example, the positive direction of the X-axis) will be defined as forward, and a moving direction of the movable platen 120 during the mold opening (for example, the negative direc-tion of the X-axis) will be defined as rearward.

The ejector unit 200 is attached to the movable platen 120, and advances and retreats together with the movable platen 120. The ejector unit 200 has an ejector rod 210 that ejects a molding product from the mold unit 800, and a drive mechanism 220 that moves the ejector rod 210 in the moving direction (X-axis direction) of the movable platen 120.

The ejector rod 210 is disposed to be able to advance and retreat in a through-hole of the movable platen 120. A front end portion of the ejector rod 210 comes into contact with an ejector plate 826 of the movable mold 820. The front end portion of the ejector rod 210 may be connected to or may not be connected to the ejector plate 826.

For example, the drive mechanism 220 has an ejector motor and a motion conversion mechanism that converts a rotary motion of the ejector motor into a linear motion of the ejector rod 210. The motion conversion mechanism includes a screw shaft and a screw nut screwed to the screw shaft. A ball or a roller may be interposed between the screw shaft and the screw nut.

The ejector unit 200 performs an ejection process under the control of the control device 700. In the ejection process, the ejector rod 210 is caused to advance from a standby position to an ejection position at a set movement speed such that the ejector plate 826 advances to eject the molding product. Thereafter, the ejector motor is driven to cause the ejector rod 210 to retreat at a set movement speed such that the ejector plate 826 retreats to an original standby position.

For example, a position or a movement speed of the ejector rod 210 is measured by using an ejector motor encoder. The ejector motor encoder measures the rotation of the ejector motor, and transmits a signal indicating a mea-surement result thereof to the control device 700. An ejector rod position detector for measuring the position of the ejector rod 210, and an ejector rod movement speed detector for measuring the movement speed of the ejector rod 210 are not limited to the ejector motor encoder, and a general detector can be used.

Injection Unit

In describing the injection unit 300, unlike the description of the mold clamping unit 100 or the description of the ejector unit 200, a moving direction of a screw 330 during filling (for example, the negative direction of the X-axis) will be defined as forward, and a moving direction of the screw 330 during plasticizing (for example, the positive direction of the X-axis) will be defined as rearward.

The injection unit 300 is installed on a slide base 301, and the slide base 301 is disposed to be able to advance and retreat with respect to the injection unit frame 920. The injection unit 300 is disposed to be able to advance and retreat with respect to the mold unit 800. The injection unit 300 touches the mold unit 800, and fills the cavity space 801 inside the mold unit 800 with the molding material. For example, the injection unit 300 has a cylinder 310 that heats the molding material, a nozzle 320 provided in a front end portion of the cylinder 310, the screw 330 disposed to be able to advance and retreat and to rotate inside the cylinder 310, a plasticizing motor 340 that rotates the screw 330, an injection motor 350 that causes the screw 330 to advance and retreat, and a load detector 360 that measures a load transmitted between the injection motor 350 and the screw 330.

The cylinder 310 heats the molding material supplied into the cylinder 310 from a feed port 311. For example, the molding material includes a resin. For example, the molding material is formed in a pellet shape, and is supplied to the feed port 311 in a solid state. The feed port 311 is formed in a rear portion of the cylinder 310. A cooler 312 such as a water-cooling cylinder is provided on an outer periphery of the rear portion of the cylinder 310. In front of the cooler 312, a first heating unit 313 such as a band heater and a first temperature measurer 314 are provided on an outer periphery of the cylinder 310.

The cylinder 310 is divided into a plurality of zones in an axial direction (for example, the X-axis direction) of the cylinder 310. The first heating unit 313 and the first temperature measurer 314 are provided in each of the plurality of zones. The control device 700 controls the first heating unit 313 so that a set temperature is set in each of the plurality of zones and a measurement temperature of the first temperature measurer 314 reaches the set temperature.

The nozzle 320 is provided in a front end portion of the cylinder 310, and is pressed against the mold unit 800. A second heating unit 323 and a second temperature measurer 324 are provided on an outer periphery of the nozzle 320. The control device 700 controls the second heating unit 323 so that a measurement temperature of the nozzle 320 reaches the set temperature.

The screw 330 is disposed to be able to rotate and to advance and retreat inside the cylinder 310. When the screw 330 is rotated, the molding material is fed forward along a helical groove of the screw 330. The molding material is gradually melted by heat from the cylinder 310 while being fed forward. As the liquid molding material is fed forward of the screw 330 and is accumulated in a front portion of the cylinder 310, the screw 330 retreats. Thereafter, when the screw 330 is caused to advance, the liquid molding material accumulated in front of the screw 330 is injected from the nozzle 320, and fills an inside of the mold unit 800.

As a backflow prevention valve for preventing a backflow of the molding material fed rearward from the front of the screw 330 when the screw 330 is pressed forward, a backflow prevention ring 331 is attached to a front portion of the screw 330 to be able to advance and retreat.

The backflow prevention ring 331 is pressed rearward by a pressure of the molding material in front of the screw 330 when the screw 330 is caused to advance, and retreats relative to the screw 330 to a close position (refer to FIG. 2) at which a flow path of the molding material is closed. Accordingly, the molding material accumulated in front of the screw 330 is prevented from flowing rearward.

On the other hand, the backflow prevention ring 331 is pressed forward by the pressure of the molding material fed forward along the helical groove of the screw 330 when the screw 330 is rotated, and advances relative to the screw 330 to an open position (refer to FIG. 1) at which the flow path of the molding material is open. Accordingly, the molding material is fed forward of the screw 330.

The backflow prevention ring 331 may be of either a co-rotation type rotating together with the screw 330 or a non-co-rotation type that does not rotate together with the screw 330.

The injection unit 300 may have a drive source that causes the backflow prevention ring 331 to advance and retreat with respect to the screw 330 between the open position and the close position.

The plasticizing motor 340 rotates the screw 330. The drive source for rotating the screw 330 is not limited to the plasticizing motor 340, and may be a hydraulic pump, for example.

The injection motor 350 causes the screw 330 to advance and retreat. A motion conversion mechanism that converts a rotary motion of the injection motor 350 into a linear motion of the screw 330 or the like is provided between the injection motor 350 and the screw 330. For example, the motion conversion mechanism has a screw shaft and a screw nut screwed to the screw shaft. A ball or a roller may be provided between the screw shaft and the screw nut. A drive source that causes the screw 330 to advance and retreat is not limited to the injection motor 350, and may be a hydraulic cylinder, for example.

The load detector 360 measures a load transmitted between the injection motor 350 and the screw 330. The measured load is converted into a pressure by the control device 700. The load detector 360 is provided in a load transmission channel between the injection motor 350 and the screw 330, and measures the load acting on the load detector 360.

The load detector 360 transmits a signal of the measured load to the control device 700. The load measured by the load detector 360 is converted into the pressure acting between the screw 330 and the molding material, and is used in controlling or monitoring the pressure received from the molding material by the screw 330, a back pressure against the screw 330, or the pressure acting on the molding material from the screw 330.

A pressure detector for measuring the pressure of the molding material is not limited to the load detector 360, and a general detector can be used. For example, a nozzle pressure sensor or a mold internal pressure sensor may be used. The nozzle pressure sensor is installed in the nozzle 320. The mold internal pressure sensor is installed inside the mold unit 800.

The injection unit 300 performs a plasticizing process, a filling process, and a holding pressure process under the control of the control device 700. The filling process and the holding pressure process may be collectively referred to as an injection process.

In the plasticizing process, the plasticizing motor 340 is driven to rotate the screw 330 at a set rotational speed such that the molding material is fed forward along the helical groove of the screw 330. As a result, the molding material is gradually melted. As the liquid molding material is fed forward of the screw 330 and is accumulated in a front portion of the cylinder 310, the screw 330 retreats. For example, a rotational speed of the screw 330 is measured by using a plasticizing motor encoder 341. The plasticizing motor encoder 341 measures the rotation of the plasticizing motor 340, and transmits a signal indicating a measurement result thereof to the control device 700. A screw rotational speed detector for measuring the rotational speed of the screw 330 is not limited to the plasticizing motor encoder 341, and a general detector can be used.

In the plasticizing process, the injection motor 350 may be driven to apply a set back pressure to the screw 330 in order to limit a sudden retreat of the screw 330. The back pressure applied to the screw 330 is measured by using the load detector 360, for example. When the screw 330 retreats to a plasticizing completion position and a predetermined amount of the molding material is accumulated in front of the screw 330, the plasticizing process is completed.

The position and the rotational speed of the screw 330 in the plasticizing process are collectively set as a series of setting conditions. For example, a plasticizing start position, a rotational speed switching position, and a plasticizing completion position are set. These positions are aligned in this order from the front side toward the rear side, and represent the start point and the end point of the section in which the rotational speed is set. The rotational speed is set for each section. The number of the rotational speed switching positions may be one or more. The rotational speed switching position may not be set. In addition, the back pressure is set for each section.

In the filling process, the injection motor 350 is driven to cause the screw 330 to advance at a set movement speed, and the cavity space 801 inside the mold unit 800 is filled with the liquid molding material accumulated in front of the screw 330. The position or the movement speed of the screw 330 is measured by using an injection motor encoder 351, for example. The injection motor encoder 351 measures the rotation of the injection motor 350, and transmits a signal indicating a measurement result thereof to the control device 700. When the position of the screw 330 reaches a set position, the filling process is switched to the holding pressure process (so-called V/P switching). The position where the V/P switching is performed will be referred to as a V/P switching position. The set movement speed of the screw 330 may be changed in accordance with the position, a time, or the like of the screw 330.

The position and the movement speed of the screw 330 in the filling process are collectively set as a series of setting conditions. For example, a filling start position (also referred to as an "injection start position"), the movement speed switching position, and the V/P switching position are set. These positions are aligned in this order from the rear side toward the front side, and represent the start point and the end point of the section in which the movement speed is set. The movement speed is set for each section. The number of the movement speed switching positions may be one or more. The movement speed switching position may not be set.

An upper limit of the pressure of the screw 330 is set for each section in which the movement speed of the screw 330 is set. The pressure of the screw 330 is measured by the load detector 360. In a case where the pressure of the screw 330 is equal to or lower than a setting pressure, the screw 330 advances at a set movement speed. On the other hand, in a case where the pressure of the screw 330 exceeds the setting pressure, in order to protect the mold, the screw 330 is caused to advance at a movement speed slower than the set movement speed so that the pressure of the screw 330 is equal to or lower than the setting pressure.

After the position of the screw 330 reaches the V/P switching position in the filling process, the screw 330 may be temporarily stopped at the V/P switching position, and thereafter, the V/P switching may be performed. Immediately before the V/P switching, instead of stopping the screw 330, the screw 330 may be caused to advance at a low speed, or may be caused to retreat at a low speed. In addition, a screw position detector for measuring the position of the screw 330 and a screw movement speed detector for measuring the movement speed of the screw 330 are not limited to the injection motor encoder 351, and a general detector can be used.

In the holding pressure process, the injection motor 350 is driven to press the screw 330 forward. A pressure (hereinafter, also referred to as a "holding pressure") of the molding material in the front end portion of the screw 330 is held at a setting pressure, and the molding material remaining inside the cylinder 310 is pressed toward the mold unit 800. An insufficient amount of the molding material due to cooling shrinkage inside the mold unit 800 can be replenished. The holding pressure is measured by using the load detector 360, for example. A set value of the holding pressure may be changed depending on an elapsed time from the start of the holding pressure process. A plurality of holding pressures and a plurality of holding times for holding the holding pressures in the holding pressure process may be respectively set, or may be collectively set as a series of setting conditions.

In the holding pressure process, the molding material in the cavity space 801 inside the mold unit 800 is gradually cooled, and when the holding pressure process is completed, an inlet of the cavity space 801 is closed by the solidified molding material. This state is referred to as gate seal, and prevents the backflow of the molding material from the cavity space 801. After the holding pressure process, a cooling process starts. In the cooling process, the molding material inside the cavity space 801 is solidified. In order to shorten a molding cycle time, the plasticizing process may be performed during the cooling process.

The injection unit 300 of the present embodiment is of an in-line screw type, but may be of a pre-plasticizing type. The injection unit of the pre-plasticizing type supplies the molding material melted inside a plasticizing cylinder to an injection cylinder, and the molding material is injected into the mold unit from the injection cylinder. Inside the plasticizing cylinder, the screw is disposed to be rotatable and not to be able to advance and retreat, or the screw is disposed to be rotatable and to be able to advance and retreat. On the other hand, a plunger is disposed to be able to advance and retreat inside the injection cylinder.

In addition, the injection unit 300 of the present embodiment is of a horizontal type in which the axial direction of the cylinder 310 is a horizontal direction, but may be of a vertical type in which the axial direction of the cylinder 310 is an upward-downward direction. The mold clamping unit combined with the injection unit 300 of the vertical type may be of the vertical type or the horizontal type. Similarly, the mold clamping unit combined with the injection unit 300 of the horizontal type may be of the horizontal type or the vertical type.

Moving Unit

In describing the moving unit 400, similarly to the description of the injection unit 300, a moving direction of the screw 330 during the filling (for example, the negative direction of the X-axis) will be defined as forward, and a moving direction of the screw 330 during the plasticizing (for example, the positive direction of the X-axis) will be defined as rearward.

The moving unit 400 causes the injection unit 300 to advance and retreat with respect to the mold unit 800. The moving unit 400 presses the nozzle 320 against the mold unit 800, thereby generating a nozzle touch pressure. The moving unit 400 includes a hydraulic pump 410, a motor 420 serving as a drive source, and a hydraulic cylinder 430 serving as a hydraulic actuator.

The hydraulic pump 410 has a first port 411 and a second port 412. The hydraulic pump 410 is a pump that can rotate in both directions, and switches rotation directions of the motor 420 such that a hydraulic fluid (for example, oil) is suctioned from any one of the first port 411 and the second port 412, and is discharged from the other to generate a hydraulic pressure. The hydraulic pump 410 can suction the hydraulic fluid from a tank, and can discharge the hydraulic fluid from any one of the first port 411 and the second port 412.

The motor 420 operates the hydraulic pump 410. The motor 420 drives the hydraulic pump 410 in a rotation direction and with a rotation torque in accordance with a control signal transmitted from the control device 700. The motor 420 may be an electric motor, or may be an electric servo motor.

The hydraulic cylinder 430 has a cylinder body 431, a piston 432, and a piston rod 433. The cylinder body 431 is fixed to the injection unit 300. The piston 432 partitions the inside of the cylinder body 431 into a front chamber 435 serving as a first chamber and into a rear chamber 436 serving as a second chamber. The piston rod 433 is fixed to the stationary platen 110.

The front chamber 435 of the hydraulic cylinder 430 is connected to the first port 411 of the hydraulic pump 410 via a first flow path 401. The hydraulic fluid discharged from the first port 411 is supplied to the front chamber 435 via the first flow path 401, whereby the injection unit 300 is pressed forward. The injection unit 300 advances, and the nozzle 320 is pressed against the stationary mold 810. The front chamber 435 functions as a pressure chamber that generates the nozzle touch pressure of the nozzle 320 by means of the pressure of the hydraulic fluid supplied from the hydraulic pump 410.

On the other hand, the rear chamber 436 of the hydraulic cylinder 430 is connected to the second port 412 of the hydraulic pump 410 via a second flow path 402. The hydraulic fluid discharged from the second port 412 is supplied to the rear chamber 436 of the hydraulic cylinder 430 via the second flow path 402, whereby the injection unit 300 is pressed rearward. The injection unit 300 retreats, and the nozzle 320 is separated from the stationary mold 810.

In the present embodiment, the moving unit 400 includes the hydraulic cylinder 430, but the present invention is not limited thereto. For example, instead of the hydraulic cylinder 430, an electric motor and a motion conversion mechanism that converts a rotary motion of the electric motor into a linear motion of the injection unit 300 may be used.

Control Device

For example, the control device 700 is configured to include a computer, and has a central processing unit (CPU) 701, a storage medium 702 such as a memory, an input interface 703, and an output interface 704 as shown in FIGS. 1 and 2. The control device 700 performs various types of control by causing the CPU 701 to execute a program stored in the storage medium 702. In addition, the control device 700 receives a signal from the outside through the input interface 703, and transmits the signal to the outside through the output interface 704.

The control device 700 repeatedly performs the plasticizing process, the mold closing process, the pressurizing process, the mold clamping process, the filling process, the holding pressure process, the cooling process, the depressurizing process, the mold opening process, and the ejection process, thereby repeatedly manufacturing the molding product. A series of operations for obtaining the molding product, for example, an operation from the start of the plasticizing process to the start of the subsequent plasticizing process, will be referred to as a "shot" or a "molding cycle". In addition, a time required for one shot will be referred to as a "molding cycle time" or a "cycle time".

For example, one molding cycle has the plasticizing process, the mold closing process, the pressurizing process, the mold clamping process, the filling process, the holding pressure process, the cooling process, the depressurizing process, the mold opening process, and the ejection process in this order. The order described here is the order of the start times of the respective processes. The filling process, the holding pressure process, and the cooling process are performed during the mold clamping process. The start of the mold clamping process may coincide with the start of the filling process. The completion of the depressurizing process coincides with the start of the mold opening process.

A plurality of processes may be performed at the same time in order to shorten the molding cycle time. For example, the plasticizing process may be performed during the cooling process of the previous molding cycle or may be performed during the mold clamping process. In this case, the mold closing process may be performed in an initial stage of the molding cycle. In addition, the filling process may start during the mold closing process. In addition, the ejection process may start during the mold opening process. In a case where an on-off valve for opening and closing the flow path of the nozzle 320 is provided, the mold opening process may start during the plasticizing process. The reason is as follows. Even when the mold opening process starts during the plasticizing process, when the on-off valve closes the flow path of the nozzle 320, the molding material does not leak from the nozzle 320.

One molding cycle may include a process other than the plasticizing process, the mold closing process, the pressurizing process, the mold clamping process, the filling process, the holding pressure process, the cooling process, the depressurizing process, the mold opening process, and the ejection process.

For example, after the holding pressure process is completed and before the plasticizing process starts, a pre-plasticizing suck-back process of causing the screw 330 to retreat to a preset plasticizing start position may be performed. The pressure of the molding material accumulated in front of the screw 330 before the plasticizing process starts can be reduced, and a sudden retreat of the screw 330 when the plasticizing process starts can be prevented.

In addition, after the plasticizing process is completed and before the filling process starts, a post-plasticizing suck-back process may be performed in which the screw 330 is caused to retreat to a preset filling start position (also referred to as an "injection start position"). The pressure of the molding material accumulated in front of the screw 330 before the filling process starts can be reduced, and a leakage of the molding material from the nozzle 320 before the filling process starts can be prevented.

The control device 700 is connected to an operation device 750 that receives an input operation of a user, and a display device 760 that displays a screen. For example, the operation device 750 and the display device 760 may be integrated with each other in a form of a touch panel 770. The touch panel 770 serving as the display device 760 displays the screen under the control of the control device 700. For example, the screen of the touch panel 770 may display settings of the injection molding machine 10, and information on a current state of the injection molding machine 10. In addition, for example, the screen of the touch panel 770 may display a button for accepting the input operation of the user or an operation portion such as an input field. The touch panel 770 serving as the operation device 750 detects an input operation of the user on the screen, and outputs a signal corresponding to the input operation to the control device 700. In this manner, for example, while confirming information displayed on the screen, the user can perform settings (including an input of a set value) of the injection molding machine 10 by operating the operation portion provided on the screen. In addition, the user can operate the injection molding machine 10 corresponding to the operation portion by operating the operation portion provided on the screen. For example, the operation of the injection molding machine 10 may be an operation (including stopping) of the mold clamping unit 100, the ejector unit 200, the injection unit 300, the moving unit 400, or the like. In addition, the operation of the injection molding machine 10 may be switching between the screens displayed on the touch panel 770 serving as the display device 760.

A case has been described in which the operation device 750 and the display device 760 of the present embodiment are integrated with each other as the touch panel 770. However, both of these may be independently provided. In addition, a plurality of the operation devices 750 may be provided. The operation device 750 and the display device 760 are disposed on the operation side (a negative direction of the Y-axis) of the mold clamping unit 100 (more specifically, the stationary platen 110).

Temperature Control of Cylinder

Figure 3:
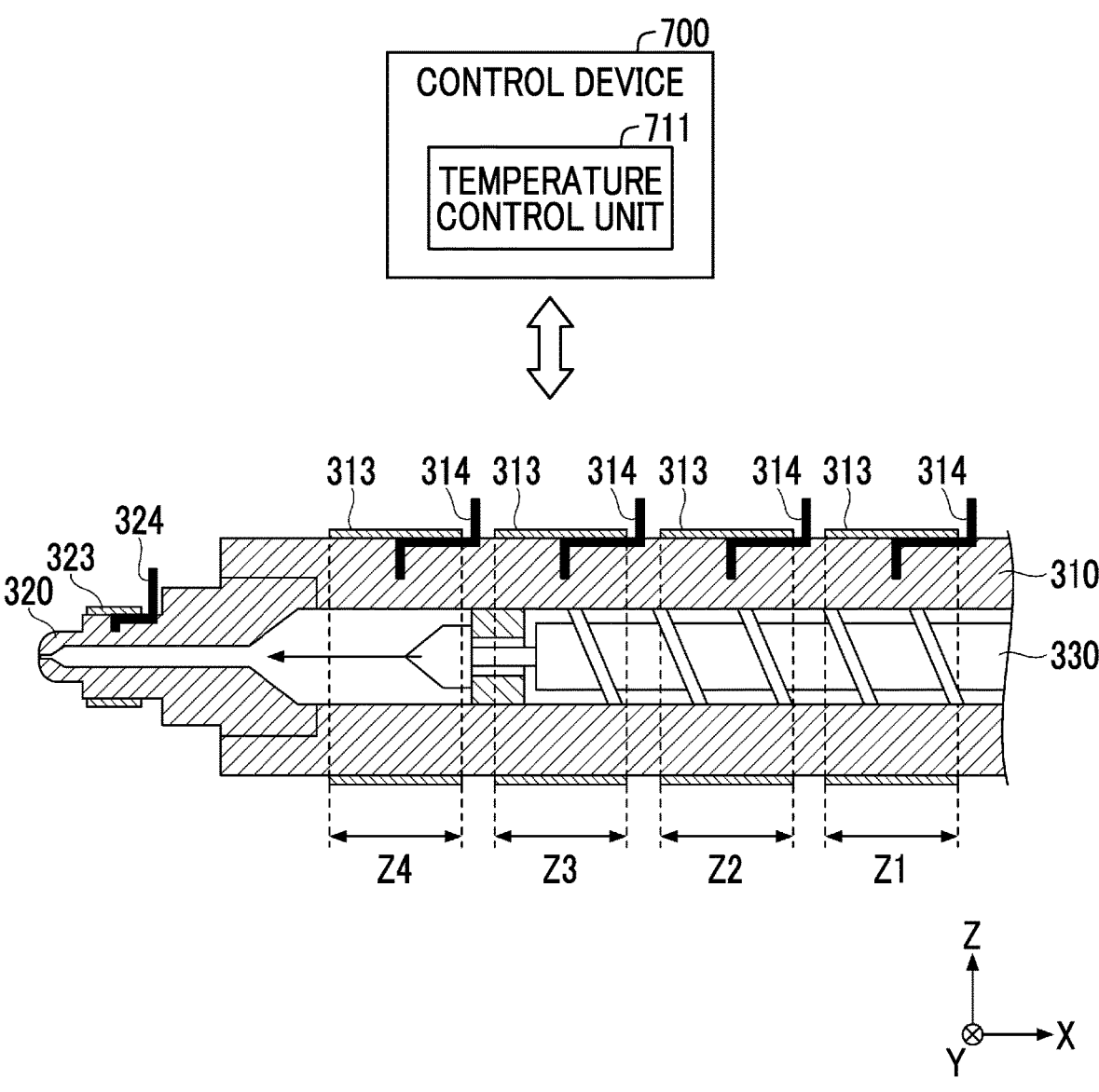
FIG. 3 is a cross-sectional view showing an example of a main part of an injection unit.

Next, an example of a main part of the injection unit 300 will be described with reference to FIG. 3. In the following description, forward means a downstream side (for example, the negative direction of the X-axis) in a flow direction of the molding material inside the cylinder 310. In addition, rearward means an upstream side (for example, the positive direction of the X-axis) in the flow direction of the molding material inside the cylinder 310.

For example, the injection unit 300 has the cylinder 310 that heats the molding material, the nozzle 320 that is provided in the front end portion of the cylinder 310, and the screw 330 that is disposed to be able to advance and retreat and to rotate inside the cylinder 310.

The cylinder 310 has the feed port 311 for the molding material (see FIGS. 1 and 2). For example, the molding material includes a resin. For example, the molding material is formed in a pellet shape, and is supplied to the feed port 311 in a solid state. The feed port 311 is formed in the rear portion of the cylinder 310.

The cylinder 310 is divided into a plurality of (for example, four) zones Z1 to Z4 in the axial direction (for example, the X-axis direction) of the cylinder 310. The first heating unit 313 and the first temperature measurer 314 are provided in each of the plurality of zones Z1 to Z4. A set temperature is set in each of the plurality of zones Z1 to Z4. The number of zones may be two or more, and is not limited to four.

The control device 700 has a temperature control unit 711. The temperature control unit 711 measures an actual temperature of each of the plurality of zones Z1 to Z4 with the first temperature measurer 314, and outputs of the respective first heating units 313 of the zones Z1 to Z4 are individually controlled so that the actual temperature measured by the first temperature measurer 314 reaches the set temperature. A plurality of the first heating units 313 may have the same configuration or different configurations. The first heating unit 313 is, for example, a band heater.

For example, the output of the first heating unit 313 is represented by a ratio (%) of an energization time per unit time. The larger the ratio of the energization time is, the larger the output of the first heating unit 313 is. Although not shown, in a case where a plurality of the first heating units 313 are provided in one zone, the ratios of the energization times of the plurality of first heating units 313 are controlled to be the same ratio.

The nozzle 320 is provided in the front end portion of the cylinder 310, and is pressed against the mold unit 800. The second heating unit 323 and the second temperature measurer 324 are provided on the outer periphery of the nozzle 320. The temperature control unit 711 controls an output of the second heating unit 323 so that a measurement temperature of the nozzle 320 reaches the set temperature. The second heating unit 323 is, for example, a coil heater.

The screw 330 is disposed to be able to rotate and to advance and retreat inside the cylinder 310. When the screw 330 is rotated, the molding material is fed forward along the helical groove of the screw 330. The molding material is gradually melted by heat from the cylinder 310 while being fed forward.

As the liquid molding material is fed forward of the screw 330 and is accumulated in the front portion of the cylinder 310, the screw 330 retreats. Thereafter, when the screw 330 is caused to advance, the liquid molding material accumulated in front of the screw 330 is injected from the nozzle 320, and fills the inside of the mold unit 800.

A temperature of the molding material in the cylinder 310 is mainly controlled by the output of the first heating unit 313, but may fluctuate due to shear heating caused by the rotation of the screw 330. Since shear heating raises the temperature of the molding material, the larger a shear heating value is, the higher the temperature of the molding material is. Unlike the output of the first heating unit 313, the shear heating value is difficult to control.

Therefore, in order to control the temperature of the molding material to a desired temperature, it is preferable to reduce the shear heating value as much as possible. The reason why the temperature of the molding material is controlled to a desired temperature is that, for example, when the temperature of the molding material is too high, molding defects occur. When the frequency of molding defects is high, the frequency of maintenance of the mold unit 800 is also high.

Examples of the molding defects caused by the temperature of the molding material being too high include gas burning, black spots, and black stripes. Gas burning is a phenomenon in which, as the molding material flows into the cavity space 801 inside the mold unit 800, a gas in the cavity space 801 is compressed and generates heat, and the molding material is carbonized. When the temperature of the molding material is too high, a large amount of gas is generated due to thermal decomposition of the molding material, and gas burning occurs. Black spots are a phenomenon in which black spots appear in a molding product. Black stripes are a phenomenon in which black streaks appear in a molding product. When the temperature of the molding material is too high, thermal deterioration of the molding material occurs, and black spots or black stripes appear.

It should be noted that the temperature of the molding material does not necessarily match a temperature of the cylinder 310, which is also one of the causes of the molding defects.

In order to manage the shear heating value, the temperature control unit 711 acquires the output of the first heating unit 313 provided in a predetermined zone (for example, zone Z4) both in a steady state in which an operation (for example, rotation, and advancing and retreating) of the screw 330 is stopped and at a time of molding at which the operation of the screw 330 is performed. The temperature control unit 711 calculates a difference in output between at the time of molding and in the steady state. In addition, the temperature control unit 711 determines whether or not the difference in output is outside of a predetermined range.

While the screw 330 rotates and simultaneously advances and retreats and shear heating occurs at the time of molding, the screw 330 does not rotate and advance and retreat, and shear heating does not occur in the steady state. Therefore, the difference in output between at the time of molding and in the steady state represents the shear heating value. Therefore, the shear heating value of the molding material can be managed by calculating the difference in output.

The temperature control unit 711 acquires the output in the steady state, for example, after a temperature rise of the cylinder 310 is completed and before the start of molding, and preferably immediately before the start of molding. In the steady state, the set temperature of each of the zones Z1 to Z4 is set to the same set temperature as at the time of molding. In addition, in the steady state, the screw 330 is stopped. Furthermore, in the steady state, the output of each of the zones Z1 to Z4 is stable, or the actual temperature of each of the zones Z1 to Z4 is stable at the set temperature.

The temperature control unit 711 acquires the output at the time of molding, for example, during a continuous operation in which the molding product is repeatedly manufactured. At the time of molding, the actual temperature of each of the zones Z1 to Z4 is typically stable at the set temperature.

Typically, at the time of molding, the molding material having a temperature lower than the set temperature of each of the zones Z1 to Z4 is supplied to each of the zones Z1 to Z4. In this case, heat is taken from the inside of each of the zones Z1 to Z4. The heat that is taken away is supplied from the outside. Therefore, the output at the time of molding is larger than the output in the steady state.

The temperature control unit 711 calculates the difference in output by subtracting the output in the steady state from the output at the time of molding. As described above, typically, the output at the time of molding is larger than the output in the steady state. However, sometimes, the output at the time of molding is smaller than the output in the steady state.

As a case where the output at the time of molding is smaller than the output in the steady state, for example, there is a case where a large amount of shear heating value is generated in a zone (for example, zone Z3) rearward of the predetermined zone (for example, zone Z4).

In a case where the shear heating value generated in the rear zone (for example, zone Z3) is large, the temperature of the molding material in the rear zone may exceed the set temperature of the predetermined zone (for example, zone Z4). As the molding material at a high temperature flows from the rear zone into the predetermined zone, the predetermined zone is heated from the inside, and as a result, the output at the time of molding becomes smaller than the output in the steady state.

The predetermined zone is not particularly limited, but is preferably the zone Z4 which is the foremost of the plurality of zones Z1 to Z4. The molding material flows from the rear to the front. As the molding material flows from the rear to the front, heat generated by the shear heating is accumulated in the molding material. Therefore, in order to control the shear heating value of the molding material, it is preferable to check the difference in output of the first heating unit 313 provided in the foremost zone Z4.

The predetermined range of the difference in output has an upper limit and a lower limit. The upper limit and the lower limit are determined by experiments or the like so that molding defects such as gas burning do not occur due to shear heating. As a case where the difference in output is less than the lower limit of the predetermined range, for example, there is a case where the output at the time of molding is smaller than the output in the steady state.

When the temperature of the molding material is low in the zone (for example, zone Z3) rearward of the predetermined zone (for example, zone Z4), a viscosity of the molding material is high, and thus the shear heating value generated in the rear zone is high. The molding material that reaches a high temperature due to shear heating flows from the rear zone into the predetermined zone. Then, the predetermined zone is heated from the inside, and the output of the first heating unit 313 provided in the predetermined zone is lowered. As a result, the difference in output falls below the lower limit in the predetermined range.

On the other hand, when the temperature of the molding material is too low in the zone (for example, zone Z3) rearward of the predetermined zone (for example, zone Z4), the molding material is not sufficiently heated even if the shear heating value is large, and the molding material having a low temperature flows from the rear zone into the predetermined zone. Then, heat is taken from the inside of the predetermined zone, and the output of the first heating unit 313 provided in the predetermined zone is increased. As a result, the difference in output exceeds the upper limit of the predetermined range.

Therefore, the shear heating value generated in a zone rearward of the predetermined zone is considered to be large both in the case where the difference in output is below the lower limit of the predetermined range and in the case where the difference in output is greater than the upper limit of the predetermined range.

In a case where the difference in output is outside of the predetermined range, the temperature control unit 711 raises the set temperature of a zone (for example, zone Z3, zone Z2, or zone Z1) rearward of the predetermined zone (for example, zone Z4). Accordingly, the output of the first heating unit 313 provided in the rear zone is increased. As a result, the viscosity of the molding material can be reduced in the rear zone, and shear heating can be suppressed.

The temperature control unit 711 may control a range of increase in the set temperature in the rear zone (for example, zone Z3) based on the difference in output of the first heating unit 313 provided in the predetermined zone (for example, zone Z4). As a difference of the difference in output from the predetermined range increases, the temperature control unit 711 increases the range of increase in the set temperature.

An upper limit is preset for the set temperature of each of the zones Z1 to Z4. The upper limit of the set temperature is set in consideration of at least one of performance of the first heating unit 313 (for example, a heating value when the output of the first heating unit 313 is 100%, and the relationship between the output of the first heating unit 313 and a progress of deterioration of the first heating unit 313) and a composition (for example, resin composition) of the molding material.

In a case where the difference in output is outside of the predetermined range, the temperature control unit 711 preferably raises the set temperature of the zone (for example, zone Z3) that is closest to the predetermined zone among the zones (for example, zone Z3, zone Z2, or zone Z1) rearward of the predetermined zone (for example, zone Z4). In the zone closest to the predetermined zone, the viscosity of the molding material can be reduced, and shear heating can be suppressed.

In a case where the difference in output is outside of the predetermined range even if the set temperature of the zone (for example, zone Z3) closest to the predetermined zone (for example, zone Z4) is raised to the upper limit, the temperature control unit 711 preferably raises the set temperature of the zone (for example, zone Z2) that is second closest to the predetermined zone. Shear heating can be further suppressed.

The temperature control unit 711 changes the set temperature based on the difference in output in an initial stage of the continuous operation in which the molding product is repeatedly manufactured. Thereafter, during the continuous operation, the temperature control unit 711 does not change the set temperature based on the difference in output. By repeatedly manufacturing the molding product under the same molding conditions, it is possible to reduce variations in the quality of the molding product.

Although not illustrated, the control device 700 may include a notification control unit that performs control to notify of an alarm in the case where the difference in output is outside of the predetermined range. It is possible to call the attention of the user of the injection molding machine 10. For example, the notification control unit controls the display device 760 (see FIGS. 1 and 2) to display an alarm on a display screen. The notification control unit may control an alarming device such as a warning light or a buzzer to output an alarm.

Next, an example of processing of the temperature control unit 711 will be described with reference to FIGS. 4 and 5. The processing shown in FIGS. 4 and 5 is repeatedly performed in the initial stage of the continuous operation in which the molding product is repeatedly manufactured, until a difference in output $\Delta W4$ of the first heating unit 313 provided in the predetermined zone Z4 falls within the predetermined range, or until set temperatures T1 to T3 in the zones Z1 to Z3 rearward of the predetermined zone Z4 reach upper limits $T1_{max}$ to $T3_{max}$.

In FIG. 4, W4 represents the output of the first heating unit 313 provided in the zone Z4, and $\Delta W4$ represents the difference in output between W4 at the time of molding and W4 in the steady state. W3 represents the output of the first heating unit 313 provided in the zone Z3, and $\Delta W3$ represents the difference in output between W3 at the time of molding and W3 in the steady state. W2 represents the output of the first heating unit 313 provided in the zone Z2, and $\Delta W2$ represents the difference in output between W2 at the time of molding and W2 in the steady state. W1 represents the output of the first heating unit 313 provided in the zone Z1, and $\Delta W1$ represents the difference in output between W1 at the time of molding and W1 in the steady state. The same applies to FIG. 5.

In FIG. 4, T4 represents the set temperature of the zone Z4, T3 represents the set temperature of the zone Z3, T2 represents the set temperature of the zone Z2, and T1 represents the set temperature of the zone Z1. The same applies to FIG. 5. In addition, in FIG. 5, $T3_{max}$ represents an upper limit of T3, $T2_{max}$ represents an upper limit of T2, and $T1_{max}$ represents an upper limit of T1.

Figure 5:
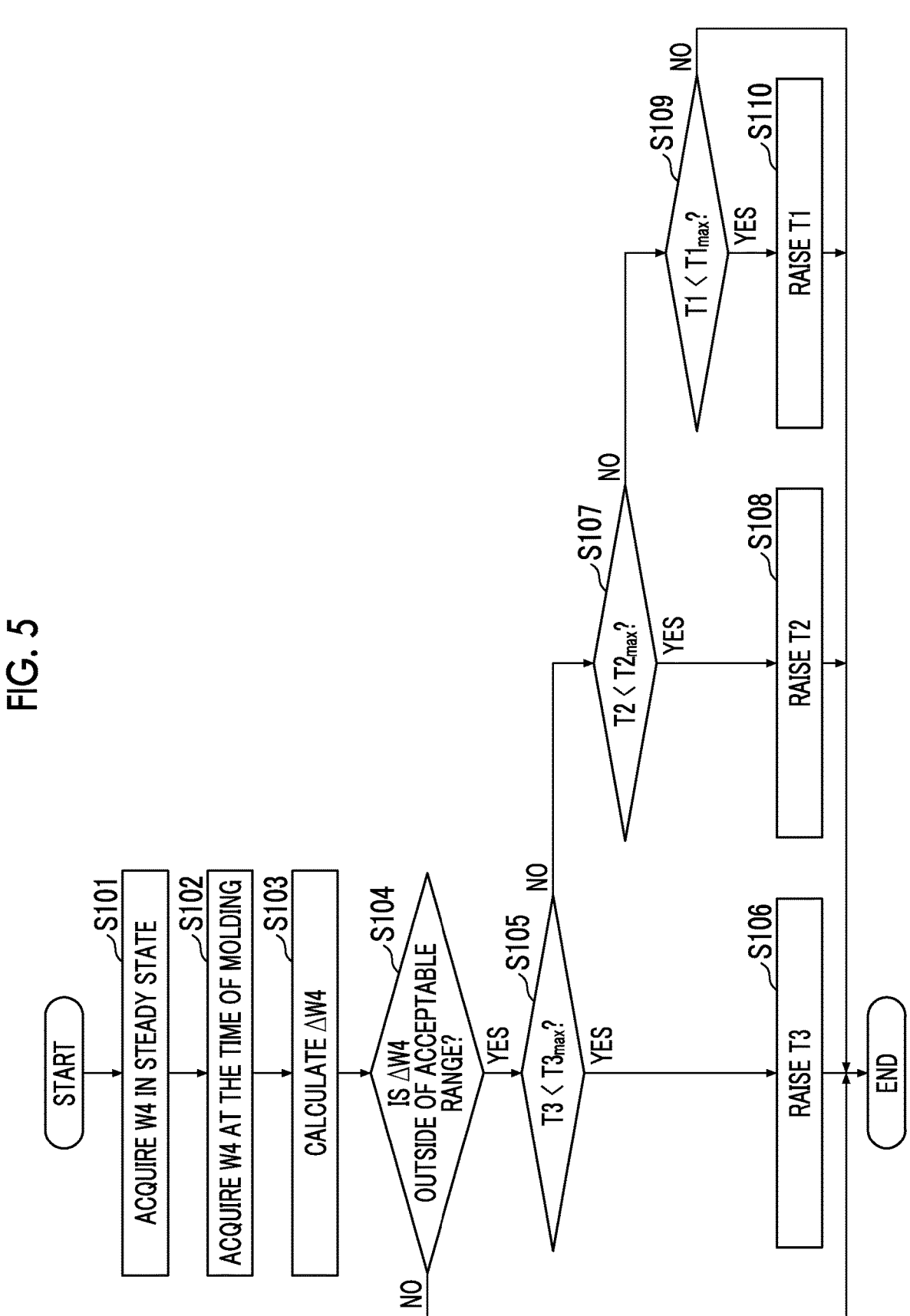
FIG. 5 is a flowchart showing an example of processing performed by a control device.

As shown in FIG. 5, the temperature control unit 711 acquires W4 in the steady state (Step S101). In the steady state, the set temperature of each of the zones Z1 to Z4 is set to the same set temperature as that at the time of molding, and the actual temperature of each of the zones Z1 to Z4 is stable at the set temperature. Thereafter, the temperature control unit 711 acquires W4 at the time of molding (Step S102). Even at the time of molding, the actual temperature of each of the zones Z1 to Z4 is stable at the set temperature.

Next, the temperature control unit 711 calculates $\Delta W4$ (Step S103), and determines whether or not $\Delta W4$ is outside of the predetermined range (Step S104). In a case where $\Delta W4$ falls within the predetermined range (NO in Step S104), the shear heating value generated in the rear zones Z1 to Z3 is small. Therefore, the temperature control unit 711 ends the current processing.

In a case where $\Delta W4$ is outside of the predetermined range (YES in Step S104), for example, as shown in FIG. 4, in a case where W4 at the time of molding is larger than W4 in the steady state and $\Delta W4$ exceeds the upper limit, the temperature control unit 711 determines whether or not T3 is less than $T3_{max}$ (Step S105). In a case where T3 is less than $T3_{max}$ (YES in Step S105), the temperature control unit 711 raises T3 (Step S106). Accordingly, the output W3 of the first heating unit 313 provided in the zone Z3 is increased (see FIRST ADJUSTMENT in FIG. 4). As a result, in the zone Z3, the viscosity of the molding material can be reduced, and shear heating can be suppressed.

In a case where T3 is T3. (NO in Step S105), the temperature control unit 711 determines whether or not T2 is less than $T2_{max}$ (Step S107). In a case where T2 is less than $T2_{max}$ (YES in Step S107) f the temperature control unit 711 raises T2 (Step S108). Accordingly, the output W2 of the first heating unit 313 provided in the zone Z2 is increased (see SECOND ADJUSTMENT in FIG. 4). As a result, in the zone Z2, the viscosity of the molding material can be reduced, and shear heating can be suppressed.

In a case where T2 is $T2_{max}$ (NO in Step S107), the temperature control unit 711 determines whether or not T1 is less than $T1_{max}$ (Step S109). In a case where T1 is less than $T1_{max}$ (YES in Step S109), the temperature control unit 711 raises T1 (Step S110). Accordingly, the output W1 of the first heating unit 313 provided in the zone Z1 is increased. As a result, in the zone Z1, the viscosity of the molding material can be reduced, and shear heating can be suppressed.

In a case where T1 is $T1_{max}$ (NO in Step S109), the temperature control unit 711 ends the current processing. In FIG. 4, since T1 in the steady state is set to $T1_{max}$, the third adjustment is not performed.

The processing shown in FIGS. 4 and 5 is applied to a case where the actual temperature of each of the zones Z1 to Z4 is stable at the set temperature not only in the steady state but also at the time of molding. The actual temperature of each of the zones Z1 to Z4 is stable at the set temperature even at the time of molding in a case where the viscosity of the molding material is relatively low.

On the other hand, in a case where the viscosity of the molding material is relatively high, the shear heating value generated at the time of molding is large, and the predetermined zone is heated from the inside. Even if the output of the first heating unit 313 is reduced, in a case where the heating amount from the inside is too large, the actual temperature becomes higher than the set temperature.

Therefore, instead of checking the output of the first heating unit 313 provided in the predetermined zone, the temperature control unit 711 may manage the shear heating value by checking the actual temperature in the predetermined zone.

Specifically, the temperature control unit 711 may acquire the actual temperature in the predetermined zone at the time of molding, calculate a temperature difference between the actual temperature at the time of molding in the predetermined zone and the set temperature, and determine whether or not the temperature difference is outside of the predetermined range. In the present embodiment, the temperature difference is obtained by subtracting the set temperature from the actual temperature at the time of molding. The method is not limited to subtracting, and any method can be adopted as long as it is possible to obtain a degree of difference.

In a case where the temperature difference is outside of the predetermined range, the temperature control unit 711 raises the set temperature of the zone (for example, zone Z3, zone Z2, or zone Z1) rearward of the predetermined zone (for example, zone Z4). Accordingly, the output of the first heating unit 313 provided in the rear zone is increased. As a result, the viscosity of the molding material can be reduced in the rear zone, and shear heating can be suppressed.

The temperature control unit 711 may control a range of increase in the set temperature in the rear zone (for example, zone Z3) based on the temperature difference of the predetermined zone (for example, zone Z4). As a difference of the temperature difference from the predetermined range increases, the temperature control unit 711 increases the range of increase in the set temperature.

An upper limit is preset for the set temperature of each of the zones Z1 to Z4. The upper limit of the set temperature is set in consideration of at least one of the performance of the first heating unit 313 (for example, the heating value when the output of the first heating unit 313 is 100%, and the relationship between the output of the first heating unit 313 and the progress of deterioration of the first heating unit 313) and the composition (for example, resin composition) of the molding material.

In a case where the temperature difference is outside of the predetermined range, the temperature control unit 711 preferably raises the set temperature of the zone (for example, zone Z3) that is closest to the predetermined zone among the zones (for example, zone Z3, zone Z2, or zone Z1) rearward of the predetermined zone (for example, zone Z4). In the zone closest to the predetermined zone, the viscosity of the molding material can be reduced, and shear heating can be suppressed.

In a case where the temperature difference is outside of the predetermined range even if the set temperature of the zone (for example, zone Z3) closest to the predetermined zone (for example, zone Z4) is raised to the upper limit, the temperature control unit 711 preferably raises the set temperature of the zone (for example, zone Z2) that is second closest to the predetermined zone. Shear heating can be further suppressed.

The temperature control unit 711 changes the set temperature based on the temperature difference in the initial stage of the continuous operation in which the molding product is repeatedly manufactured. Thereafter, during the continuous operation, the temperature control unit 711 does not change the set temperature based on the temperature difference. By repeatedly manufacturing the molding product under the same molding conditions, it is possible to reduce variations in the quality of the molding product.

Although not illustrated, the notification control unit performs control to notify of an alarm in the case where the temperature difference is outside of the predetermined range. It is possible to call the attention of the user of the injection molding machine 10. For example, the notification control unit controls the display device 760 (see FIGS. 1 and 2) to display an alarm on the display screen. The notification control unit may control an alarming device such as a warning light or a buzzer to output an alarm.

Next, an example of processing of the temperature control unit 711 will be described with reference to FIG. 6. The processing shown in FIG. 6 is repeatedly performed in the initial stage of the continuous operation in which the molding product is repeatedly manufactured, until a temperature difference $\Delta T4$ of the predetermined zone Z4 falls within the predetermined range, or until the set temperatures T1 to T3 in the zones Z1 to Z3 rearward of the predetermined zone Z4 reach the upper limits $T1_{max}$ to $T3_{max}$.

In FIG. 6, T4A represents the actual temperature of the zone Z4 at the time of molding, and $\Delta T4$ represents the temperature difference between the actual temperature of the zone Z4 at the time of molding and the set temperature. In addition, T3 represents the set temperature of the zone Z3, $T3_{max}$ represents the upper limit of T3, T2 represents the set temperature of the zone Z2, $T2_{max}$ represents the upper limit of T2, T1 is the set temperature of the zone Z1, and $T1_{max}$ represents the upper limit of T1.

As shown in FIG. 6, the temperature control unit 711 acquires T4A at the time of molding (Step S202). Next, the temperature control unit 711 calculates $\Delta T4$ (Step S203), and determines whether or not $\Delta T4$ is outside of the predetermined range (Step S204). In a case where $\Delta T4$ falls within the predetermined range (NO in Step S204), the shear heating value generated in the rear zones Z1 to Z3 is small. Therefore, the temperature control unit 711 ends the current processing.

In a case where $\Delta T4$ is outside of the predetermined range (YES in Step S204), the temperature control unit 711 determines whether or not T3 is less than $T3_{max}$ (Step S205). In a case where T3 is less than $T3_{max}$ (YES in Step S205), the temperature control unit 711 raises T3 (Step S206). Accordingly, the output W3 of the first heating unit 313 provided in the zone Z3 is increased. As a result, in the zone Z3, the viscosity of the molding material can be reduced, and shear heating can be suppressed.

In a case where T3 is T3. (NO in Step S205), the temperature control unit 711 determines whether or not T2 is less than $T2_{max}$ (Step S207). In a case where T2 is less than $T2_{max}$ (YES in Step S207) f the temperature control unit 711 raises T2 (Step S208). Accordingly, the output W2 of the first heating unit 313 provided in the zone Z2 is increased. As a result, in the zone Z2, the viscosity of the molding material can be reduced, and shear heating can be suppressed.

In a case where T2 is $T2_{max}$ (NO in Step S207), the temperature control unit 711 determines whether or not T1 is less than $T1_{max}$ (Step S209). In a case where T1 is less than $T1_{max}$ (YES in Step S209) f the temperature control unit 711 raises T1 (Step S210). Accordingly, the output W1 of the first heating unit 313 provided in the zone Z1 is increased. As a result, in the zone Z1, the viscosity of the molding material can be reduced, and shear heating can be suppressed.

In a case where T1 is $T1_{max}$ (NO in Step S209), the temperature control unit 711 ends the current processing.

Hitherto, the embodiments of the control device of an injection molding machine, the injection molding machine, and the method of controlling an injection molding machine according to the present invention have been described. However, the present invention is not limited to the above-described embodiments. Various modifications, corrections, substitutions, additions, deletions, and combinations can be made within the scope of the appended claims. As a matter of course, all of these also belong to the technical scope of the present invention.

It should be understood that the invention is not limited to the above-described embodiment, but may be modified into various forms on the basis of the spirit of the invention. Additionally, the modifications are included in the scope of the invention.

What is claimed is:

1. A control device of an injection molding machine, which individually controls outputs of a plurality of heating units based on a temperature measured by a temperature measurer for a plurality of zones, respectively, into which a cylinder is divided in a flow direction of a molding material, the control device comprising:

a processor configured to acquire a first output of a heating unit provided in a predetermined zone, among the plurality of heating units, in a steady state when a screw provided inside the cylinder is stopped, acquire a second output of the heating unit at a time of molding when the screw is operated, calculate a difference in the first output and the second output, raise a set temperature of a zone upstream of the predetermined zone in the flow direction, in an initial stage of a continuous operation in which the injection molding machine manufactures a molding product repeatedly, when the difference indicates that the second output is larger than the first output by more than a predetermined condition, the upstream zone closer to a feed port of the cylinder than the predetermined zone, and control an output of a heating unit provided in the zone upstream of the predetermined zone based on the set temperature during subsequent stages of the continuous operation, wherein the processor is configured to increase an amount by which the set temperature of the upstream zone is raised as the difference increases.

2. The control device of an injection molding machine according to claim 1, wherein, in a case where the difference indicates that the second output is larger than the first output by more than the predetermined condition, a set temperature of the zone closest to the predetermined zone among the zones upstream of the predetermined zone in the flow direction is raised.

3. The control device of an injection molding machine according to claim 2, wherein, in a case where the difference indicates that the second output is larger than the first output by more than the predetermined condition even if the set temperature of the zone closest to the predetermined zone is raised to an upper limit, a set temperature of the zone second closest to the predetermined zone is raised.

4. The control device of an injection molding machine according to claim 1, wherein the control device performs control to notify of an alarm in a case where the difference indicates that the second output is larger than the first output by more than the predetermined condition.

5. The control device of an injection molding machine according to claim 1, wherein the processor is configured to maintain the set temperature during subsequent stages of the continuous operation.

6. An injection molding machine comprising:

the control device according to claim 1;

the cylinder; and the heating unit.

7. A method of controlling an injection molding machine, in which outputs of a plurality of heating units for a plurality of zones, respectively, into which a cylinder is divided in a flow direction of a molding material are individually controlled based on a temperature measured by a temperature measurer, the method comprising:

a process of acquiring a first output of a heating unit provided in a predetermined zone, among the plurality of heating units, in a steady state when a screw provided inside the cylinder is stopped;

a process of acquiring a second output of the heating unit at a time of molding when the screw is operated;

a process of calculating a difference in the first output and the second output;

a process of raising a set temperature of a zone upstream of the predetermined zone in the flow direction, in an initial stage of a continuous operation in which the injection molding machine manufactures a molding product repeatedly, when the difference indicates that the second output is larger than the first output by more than a predetermined condition, the upstream zone closer to a feed port of the cylinder than the predetermined zone; and a process of controlling an output of a heating unit provided in the zone upstream of the predetermined zone based on the set temperature during subsequent stages of the continuous operation, wherein an amount by which the set temperature of the upstream zone is raised increases as the difference increases.

* * * * *